Nov. 30, 1965   V. A. HOOVER   3,221,118
ACTUATOR WITH SELF-PROTECTING LIMITING MECHANISM
Original Filed Sept. 5, 1957
Fig. 1
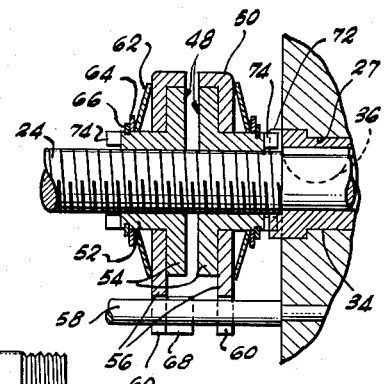
Fig. 2
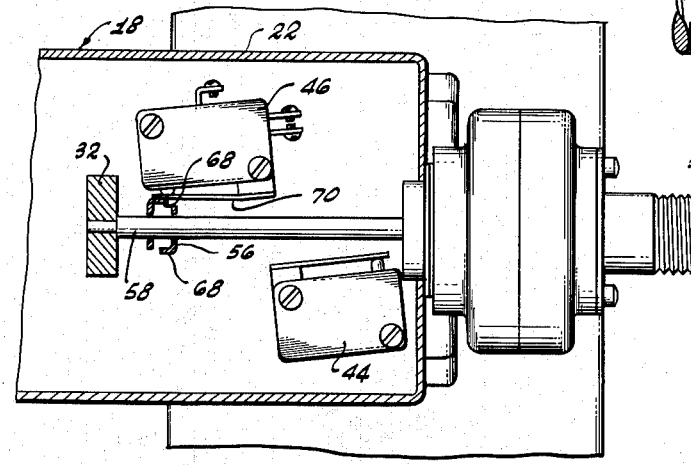
Fig. 3
INVENTOR.
VAINO A. HOOVER
BY Fulwider Mattingly Huntley
ATTORNEYS United States Patent Office 3,221,118
Patented Nov. 30, 1965

3,221,118
ACTUATOR WITH SELF-PROTECTING
LIMITING MECHANISM
Vaino A. Hoover, 1433 San Vicente Blvd.,
Santa Monica, Calif.
Original application Sept. 5, 1957, Ser. No. 682,121, now Patent No. 3,087,105, dated Apr. 23, 1963. Divided and this application June 13, 1962, Ser. No. 202,170
5 Claims. (Cl. 200—47)

The present application is a division of my prior copending application entitled Electromechanical Actuator With Limiting Mechanism, Serial No. 682,121, filed September 5, 1957, now Patent No. 3,087,105.

This invention relates generally to electromechanical actuators, and more particularly to an actuator embodying an improved mechanism for limiting the movement of its output member.

Electromechanical actuators have been found to be very effective means for actuating movable parts. One of the principal applications for these actuators is in modern aircraft, where they are used for such purposes as the actuation of trim tabs and the like. Such actuators also serve effectively in many other applications, including industrial automation.

In most applications of actuators of the subject type, it is an operational requirement that movement of the output member be accurately controlled within predetermined limits. To achieve this, the actuator is equipped with a limiting mechanism which serves to terminate operation of the actuator in a given direction, when the driven device has reached a corresponding limit position. It will be readily appreciated that, particularly in aircraft applications where a malfunction is potentially disastrous, the operation of the actuator must be as foolproof as possible. Moreover, the operation of the limiting mechanism is especially crucial. A malfunction of the limiting mechanism is likely to result in damage to the mechanism itself, as well as to other parts of the actuator and driven device.

It is, therefore, extremely important in such actuators, not only that the limiting mechanism be as troublefree as possible, but also that additional protective means be provided which will prevent damage in the event a malfunction should occur. It is in this latter regard that prior actuators have been particularly lacking.

Another requisite feature of actuators in aircraft and many other applications is that they be constructed and arranged so that the limit positions of the output member can be adjustably established. This is necessary for the reason that the part to be actuated normally has manufacturing tolerances. Moreover, additional tolerances frequently develop during assembly. To compensate for such tolerances and insure that the limit positions of the actuator and its associated driven device coincide, it is necessary to provide for final adjustment after assembly.

Further operational requirements of such actuators in aircraft applications are that, in addition to the above capabilities, the device be sufficiently sturdy to withstand sustained vibration and rapidly fluctuating atmospheric conditions, and be relatively light in weight.

It is, therefore, a major object of this invention to provide an electromechanical actuator embodying a limiting mechanism, which satisfies all of the above requirements.

Another object is to provide an electromechanical actuator with a limiting mechanism for accurately controlling movement of its output member within predetermined limits, the mechanism incorporating means for protecting it from damage in the event of a malfunction.

It is a further object of this invention to provide an actuator of the type described in which the limiting mechanism can be either manually adjusted to accurately establish the limit positions desired or automatically adjusted so that those positions substantially coincide with the mechanical limits of the driven device.

Another object of this invention is to provide a compact, lightweight actuator of the type described which comprises a minimum number of component parts, and which is relatively simple in construction and inexpensive to manufacture.

These and other objects, features, and advantages of the invention will be better understood by referring to the following detailed description taken in conjunction with the accompanying drawing of an illustrative embodiment, in which:

FIGURE 1 is a side view, partly in elevation and partly in section, of the actuator of the invention, showing the limiting mechanism in one of its limit positions;

FIGURE 2 is a partial sectional view taken along the line 2—2 of FIGURE 1; and

FIGURE 3 is an enlarged sectional view of the area encircled by the line 3 of FIGURE 1, showing the limiting mechanism in its limit position opposite that occupied in FIGURE 1.

Referring to the drawings, and in particular to FIGURE 1 thereof, numeral 10 designates the actuator of the invention. The actuator 10 includes generally a reversible electric drive motor 12, a magnetic clutch and brake unit 14, reduction gearing 16, and a limiting mechanism 18. As illustrated, the motor is coupled through the clutch and brake unit 14 and the reduction gearing 16 to a rotatable output shaft 20. The motor 12 is adapted to be selectively energized so as to drive the shaft 20 clockwise or counterclockwise, as viewed from the right hand end of FIGURE 1.

The function of the magnetic clutch and brake unit 14 is to detachably couple the motor 12 to the gearing 16. A unit of the type disclosed in my U.S. Patent No. 2,618,368 entitled Magnetic Clutch and issued November 18, 1952, may be used to advantage for this purpose. As the patent reveals, the main advantage of the magnetic clutch and brake unit is to automatically operate when the output shaft has been driven to a desired position and the motor de-energized, to hold the shaft against movement under the influence of externally applied loads. The unit 14 has further utility in selected applications, where it may be automatically actuated to detach the motor from its reduction gearing and thereby permit two actuators, when driven as a pair, to be driven by one drive motor, should one motor fail.

The limiting mechanism 18 is enclosed in a separate housing 22 which, in turn, is detachably secured to the housing of the motor 12 and magnetic clutch and brake unit 14. Rotatably mounted within the housing 22 is a cam shaft 24 having an end portion 26 projecting through a bore 27 in an end plate 28 of the housing 22. This end portion 26 is receivable in a mating bore 30 in the output shaft 20 to detachably connect the two shafts in axial alignment with one another. Preferably, in order to insure that the shafts 20 and 24 rotate in unison, they are keyed together by making the end portion 26 and mating bore 30 non-circular in shape. Since the housing 22 and the cam shaft 24 are both detachably connected to other actuator parts, the limiting mechanism 18 may be readily separated from other major components without disconnection of any electrical circuits.

Rotational mounting of the cam shaft 24 within the housing 22 is accomplished by journaling the shaft 24 in the bore 27 in the end plate 28 at one end and in a bore 31 in an upright support 32 fixed to the housing at its other end. Bearing support is enhanced by securing bearing sleeves 34 to the opposite ends of the shaft, which sleeves, in turn, contact the opposed bearing surfaces on the plate 28 and support 32. The sleeves 34 are each keyed to the shaft 24 by any suitable means as, for example, by the half-moon key 36 (FIGURE 3), so as to as to rotate with the shaft.

A pair of cam assemblies 40 and 42 are mounted on the shaft 24 and arranged to move axially relative thereto, responsive to rotation of the shaft. The functions of these assemblies are to actuate switches 44 and 46 (FIGURE 2), respectively, in predetermined limit positions of the output shaft 20 to de-energize the drive motor 12. This serves to limit rotation of the output shaft 20 in clockwise and counterclockwise directions.

In order that the assemblies 40 and 42 move in translation responsive to shaft rotation, each includes a flanged nut or collar 48 and a cooperating disk-shaped brake 50. The nut 48 embodies an axial sleeve 52, which is internally threaded for engagement with threads provided on the shaft 24, and a radial flange 54. Each brake 50 is receivable on the sleeve 52 of its nut 48 and engages in face to face relationship with the flange 54.

Rotation of the brakes 50 with the shaft 24 is prevented by providing each of them with a radially extending arm 56 that engages a guide rod 58 supported between the end plate 28 and support 32 on the housing. The rod 58 is arranged parallel to, but slightly offset from, the cam shaft 24. In the illustrative case, the arms 56 are forked at their lower ends, as best shown in FIGURE 3, for the reception of the rod 58. The brakes 50 are thus free to move axially relative to the shaft 24 and rod 58, but are held against rotation.

It is normally desirable to restrain the nuts 48 against rotation with the shaft 24 in order that the assemblies 40 and 42 will be caused to move axially in response to rotation of the shaft. To this end, annular spring washers 62 are provided to yieldably urge the brakes 50 into frictional engagement with their flanges 54. Each spring 62 bears against one of the brakes 50 and against annular backup washer 64 which, in turn, is held in place by a snap ring 66 receivable in a peripheral groove in the nut-sleeve 52. It will be appreciated that the spring 62 is sufficiently strong to overcome friction between the engaging threads of the nuts 48 and shaft 24 to yieldably restrain the nuts against rotation with the shaft. Adjustment of the relative positions of the cam assemblies on the shaft 24 may be accomplished by simply rotating a given nut 48 relative to the shaft 24. During such adjustment, slippage takes place between the frictionally engaging surfaces of the nut 48 and brake 50.

As noted above, switches 44 and 46 on the housing 22 are adapted to be actuated by the cam assemblies 40 and 42, respectively, at the limit positions of the output shaft 20. The switches are positioned adjacent opposite ends of the cam shaft 24, the switch 44 being located adjacent the right hand end of the shaft, as viewed in the drawing, and connected in the energizing circuit of the motor 12, which causes clockwise rotation of the output shaft 20. Likewise, the switch 46 is positioned adjacent the opposite end of the cam shaft 24 and connected in the circuit of the motor 12, which brings about counterclockwise rotation of the shaft 20. Upon actuation of a given switch, its respective motor circuit is de-energized, so that no further rotation takes place in that direction. Actuation of the switches takes place by virtue of fingers 68 on the lower ends of the brake arms 56 engaging switch arms 70 in the manner shown in FIGURE 2.

In normal operation, assuming the cam assemblies 40 and 42 to have been adjusted so that they actuate their respective switches 44 and 46 at the desired rotational limits of the output shaft 20, the motor 12 is energized to rotate the output shaft in the desired direction. With the motor energized for clockwise rotation of the shaft 20, the cam assemblies 40 and 42 move axially on the shaft 24 from left to right in the drawing or toward the clockwise switch 44. As previously explained, the brakes 50 serve to restrain rotation of the nuts 48 with the shaft 24, and thus the assemblies 40 and 42 maintain their original spacing. Such operation continues until the clockwise switch 44 is actuated to de-energize the drive motor 12 and terminate rotation of the output shaft 20.

As long as the switch 44 is actuated, further operation of the actuator in a clockwise direction cannot take place. However, the motor 12 may, of course, be energized to rotate the output shaft 20 (and cam shaft 24) in a counterclockwise direction. This results in the cam assemblies 40 and 42 moving toward the counterclockwise switch 46 at the opposite end of the cam shaft 24. As soon as the cam assembly 40 has been carried out of engagement with the switch 44, that switch closes, and the motor 12 may again be energized to rotate the output shaft 20 clockwise. Upon continued counterclockwise rotation of the output shaft 20, the cam assembly 42 will actuate the counterclockwise switch 46 to deenergize the motor 12 and terminate rotation of the output shaft 20 in that direction.

An important feature of the actuator of the invention is that the frictional coupling between the nut 48 and brake 50 of each cam assembly serves to protect the limiting mechanism from damage in the event of a malfunction. In this connection, if either switch fails, the cam assemblies will be carried into mechanical stops comprising the inner ends of the bearing sleeves 34 on the cam shaft 24. The engaged assembly then maintains its axial position with slippage taking place between the nut 48 and brake 50. For example, if the clockwise switch should fail, as the shaft 24 is undergoing clockwise rotation, the assembly 40 will move to the position shown in FIGURE 3, where its nut 48 engages the end of the bearing sleeve 34. That nut then rotates with the shaft 24, overcoming frictional restraining force applied by the brake.

Should clockwise rotation of the cam shaft 24 continue, the second cam assembly 42 will move axially toward the assembly 40, and eventually its nut 48 will abut the rotating nut of the assembly 40 and commence rotating with it. Relative rotation then takes place between both pairs of nuts 48 and brakes 50 and will continue to do so until the actuator is either stopped or reversed. As will be appreciated, the cam assemblies can be adusted after such a malfunction takes place, because the parts have been prevented from being damaged.

Positive engagement between the cam assemblies and their mechanical stops on the shaft 24 is insured by providing matching sets of jaws 72 and 74 on the bearing sleeves 34 and nuts 48. The jaws 72 on the sleeves 34 rotate with the cam shaft 24 and, therefore, when the jaws 74 on the nuts 48 engage the former, the nuts 48 are forced to rotate with the cam shaft 24 and are prevented from jamming.

To enable the nuts 48 to rotate with respect to their associated brakes 50 without damage to the mechanism 18, while at the same time affording ample friction between them to normally restrain relative rotation, the nuts are preferably made of bronze and the brakes of steel. Since the parts are disposed in face to face relationship, a bronze on steel bearing relationship exists, and the continued rotation of the nuts 48 does not result in damage to the assemblies or in excessive loads on the motor.

As explained above, manual adjustment positions of the output shaft 20 is effected simply by moving the cam assemblies 40 and 42 axially relative to one another on the cam shaft 24.

In order that the output shaft 20 may have the desired range of rotational movement, it is necessary that the spacing of the switches 44 and 46 be sufficiently great that, when the assemblies 40 and 42 are positioned immediately adjacent one another, the shaft is still able to move between its limit positions. The range of movement of the output shaft can, of course, be increased by changing the thread design of the cam shaft 24 and nuts 48 by increasing the switch spacing, as well as the length of the cam shaft 24.

Another advantage of the self-protecting clutch feature of the limiting mechanism 18 is that it may be used to set the cam assemblies 40 and 42 in positions corresponding substantially to the mechanical limits of the driven device. This is achieved by temporarily shorting the switches 44 and 46 and, with the assemblies initially spaced apart a distance greater than their final spacing, driving the device first into one mechanical limit and then into the other.

Assuming the output shaft 20 is first rotated in a clockwise direction, the cam assembly 40 will be carried into its stop and will remain there with relative rotation taking place between its nut 48 and brake 50 until the driven device reaches its mechanical limit. At that time, the actuator is reversed so that both cam assemblies 40 and 42 will begin axial travel in the opposite direction on the shaft 24 until the cam assembly 42 engages its stop. Then, as explained above, its axial travel, of course, ceases, but the other assembly 40 moves toward it and until the driven device reaches its mechanical limit in the counter-clockwise direction. The actuator is then de-energized, and the limits of the cam assemblies are substantially in coincidence with the mechanical limits of the driven device.

Final precise adjustment is normally accomplished manually by rotating the nuts 48 in small increments. The switches 44 and 46 are finally put back in operation, and whenever the driven device just approaches one or the other of its mechanical limits, one of the cam assemblies will actuate its associated switch to de-energize the motor. Moreover, as explained in detail above, if switch actuation should fail to de-energize the motor, then the assemblies will move into their respective stops and maintain that position without resulting damage to the limiting mechanism.

It will be understood that in the illustrative embodiment of the invention, the output shaft 20 and the cam shaft 24 continue rotating in the evenut of a malfunction, even though slippage is taking place in the limiting mechanism. This apparent problem may be solved by providing a torque limiting clutch on the driven device or between the output shaft 20 and the driven device. However, should it be desired to incorporate a torque limiting clutch in the actuator itself, this, of course, may be done. In this connection, the torque limiting clutch, such as disclosed in my U.S. Patent No. 2,668,426 entitled Torque Limiting Clutch and issued February 9, 1954, may be used quite effectively for this purpose.

Although one embodiment of the invention has been illustrated and described with a certain degree of particularity, it will be understood that this was only by way of illustration and that various changes in the details of the construction and arrangement of the various parts may be made without departing from the spirit and scope of the invention.

I claim:

1. In an electromechanical actuator having an output shaft rotatable in opposite directions to move a device between extended and retracted positions and a reversible motor coupled to said shaft, a limiting mechanism comprising:

a frame;
an externally threaded cam shaft rotatably mounted on said frame and coupled to said output shaft;
a pair of switch means on said frame actuatable for de-energizing said motor;
a pair of nuts threadedly engaged on said cam shaft for axial movement relative thereto, each of said nuts including a radial flange;
a pair of brakes mounted in face to face relationship with respective ones of said nut flanges, said brakes being held against rotational movement, but being free for axial movement relative to said cam shaft with respective ones of said nuts;
spring means carried by the nut of each brake-nut pair for yieldably urging the brake of that pair against its nut-flange to restrain the nut against rotation with said cam shaft;
means on said brakes and engageable with respective ones of said switch means to actuate said switch means substantially when said output shaft has turned through a predetermined number of revolutions necessary to place said device in its extended and retracted positions;
and stop means mounted at opposite ends of said cam shaft and rotatable therewith, said stop means engaging adjacent ones of said nuts when said output shaft has turned through a number of revolutions greater than said predetermined number.

2. In an electromechanical actuator having an output shaft rotatable in opposite directions to move a device between extended and retracted positions and a reversible motor coupled to said shaft, a limiting mechanism comprising:

a frame;
a cam shaft rotatably mounted on said frame and coupled to said output shaft;
a pair of switch means mounted on said frame and actuatable for de-energizing said motor;
a pair of cam assemblies adjustably and movably mounted on said cam shaft and each having shaft-engaging means rotatable with said cam shaft, whereby its assembly maintains a given axial position on said cam shaft, and rotatable relative thereto to cause its assembly to move axially relative to said cam shaft, said assemblies engaging respective ones of said switch assemblies for actuating the same; and
frictional clutch means on each of said assemblies normally restraining said shaft-engaging means against rotation with said cam shaft to cause its respective cam assembly to move axially as aforesaid and responsive to blocking of such axial movement of its respective cam assembly to permit said shaft-engaging means to rotate with said cam shaft.

3. In an electromechanical actuator having an output shaft rotatable in opposite directions to move a device between extended and retracted positions and a reversible motor coupled to said shaft, a limiting mechanism comprising:

a frame;
an externally threaded cam shaft rotatably mounted on said frame and coupled to said output shaft;
switch means mounted on said frame actuatable for de-energizing said motor;
a cam assembly including a nut mounted on said cam shaft in engagement with said threads, whereby relative rotation between said nut and shaft causes said nut to move axially of said shaft, a brake mounted in face-to-face relationship with said nut, and means on said nut urging said brake into frictional engagement with said nut to restrain relative rotation thereof;
means on said frame in engagement with said brake to prevent rotation thereof, but to permit axial movement thereof relative to said cam shaft;
and means carried by said assembly and engaging said switch means for actuating the same.

4. The subject matter of claim 2 including stop means mounted at opposite ends of said cam shaft for rotation therewith, said stop means being engageable with respective ones of said cam assemblies to block such axial movement.

5. In an electromechanical actuator having an output shaft rotatable in opposite directions to move a device between extended and retracted positions and a reversible motor coupled to said shaft, a limiting mechanism comprising:
- an externally threaded and rotatable cam shaft coupled to said output shaft;
- switch means actuatable for de-energizing said motor;
- a nut mounted on said cam shaft in engagement with said threads, whereby relative rotation between said nut and shaft causes said nut to move axially of said shaft;
- a brake mounted in face-to-face relationship with said nut;
- means on said nut urging said brake into frictional engagement with said nut to restrain relative rotation thereof;
- guide means parallel to and offset from said cam shaft, said guide means being engaged with said brake to prevent rotation, but to permit axial movement thereof relative to said cam shaft; and
- means on said brake engaging said switch means for actuating the same.

References Cited by the Examiner
UNITED STATES PATENTS

| | | | |
|---|---|---|---|
| 2,469,269 | 5/1949 | Lear | 192—143 |
| 2,531,109 | 11/1950 | Chapman | 192—142 |
| 2,661,450 | 12/1953 | Moler | 200—47 X |
| 2,854,113 | 9/1958 | Hallden | 192—141 |
| 2,893,258 | 7/1959 | Meyer | 192—142 |

BERNARD A. GILHEANY, *Primary Examiner.*

ROBERT K. SCHAEFER, D. J. WILLIAMOWSKY,
*Examiners.*